(12) United States Patent　　(10) Patent No.: US 11,035,159 B1
Kaufman　　(45) Date of Patent: Jun. 15, 2021

(54) BI-DIRECTIONAL AUTOMATIC GATE LATCH ASSEMBLY

(71) Applicant: Flint Hills Industries, Inc., Hillsboro, KS (US)

(72) Inventor: Thomas Kaufman, Hillsboro, KS (US)

(73) Assignee: Flint Hills Industries, Inc., Hillsboro, KS (US)

( * ) Notice: Subject to any disclaimer, the term of this patent is extended or adjusted under 35 U.S.C. 154(b) by 765 days.

(21) Appl. No.: 15/920,447

(22) Filed: Mar. 13, 2018

Related U.S. Application Data (60) Provisional application No. 62/470,702, filed on Mar. 13, 2017.

(51) Int. Cl.
　*E05C 3/16*　　(2006.01)
　*E05C 3/00*　　(2006.01)
　*A01K 1/00*　　(2006.01)
　*B60P 3/04*　　(2006.01)

(52) U.S. Cl.
　CPC ............ *E05C 3/162* (2013.01); *A01K 1/0017* (2013.01); *A01K 1/0035* (2013.01); *B60P 3/04* (2013.01); *E05C 3/008* (2013.01)

(58) Field of Classification Search
　CPC . E05C 3/162; E05C 3/008; E05C 3/16; A01K 1/0017; A01K 1/0035; B60P 3/04; E05B 65/0007; E05B 65/0014; E05B 63/20; Y10S 292/29; Y10S 292/26
　USPC .............................................. 49/55, 57, 394
　See application file for complete search history.

(56) References Cited

U.S. PATENT DOCUMENTS

| | | | | |
|---|---|---|---|---|
| 1,241,671 A | * | 10/1917 | Smith | E05B 85/243 |
| | | | | 292/216 |
| 1,280,665 A | * | 10/1918 | Clay | E05B 85/243 |
| | | | | 292/216 |
| 2,758,863 A | * | 8/1956 | Waymire | E05B 65/06 |
| | | | | 292/216 |
| 4,135,747 A | * | 1/1979 | Melilli | E05B 65/0007 |
| | | | | 292/175 |
| 4,167,281 A | * | 9/1979 | Spencer | E05B 65/0007 |
| | | | | 292/210 |

(Continued)

FOREIGN PATENT DOCUMENTS

| | | | | |
|---|---|---|---|---|
| EP | 1025750 A2 | * | 8/2000 | ........... A01K 1/0017 |
| GB | 811493 A | * | 4/1959 | .............. E06B 11/02 |
| GB | 2479589 A | * | 10/2011 | ............... A47D 7/00 |

*Primary Examiner* — Kristina R Fulton
*Assistant Examiner* — Steven A Tullia
(74) *Attorney, Agent, or Firm* — Jeffrey L. Thompson; Thompson Law, P.A (57) ABSTRACT

A gate assembly has a gate panel with a hinge, a latch assembly, and a base member connected to a wall. The latch assembly has a catch member for engaging the base member when the gate panel is in a closed position, and a channel member for locking the catch member against rotation. The catch member is rotatable about a vertical axis and has an open channel facing the base member. The channel member has an open channel facing downwardly that can be lowered onto the catch member to prevent rotation. The channel member has released positions in which one side of the channel member is above the catch member to allow the gate panel to open, and another side of the channel member remains below an upper end of the catch member to prevent the catch member from pivoting past the latched position when the gate panel is closed.

19 Claims, 10 Drawing Sheets

(56) References Cited

U.S. PATENT DOCUMENTS

| | | | | |
|---|---|---|---|---|
| 4,240,278 | A * | 12/1980 | Linder | E05B 65/0007 |
| | | | | 292/205 |
| 5,103,658 | A * | 4/1992 | McQuade | E05B 65/0007 |
| | | | | 49/394 |
| 5,809,694 | A * | 9/1998 | Postans | E05B 65/0007 |
| | | | | 49/57 |
| 5,890,320 | A * | 4/1999 | Andersen | E06B 9/04 |
| | | | | 49/465 |
| 6,036,245 | A * | 3/2000 | Schaefer | E05B 65/0007 |
| | | | | 292/119 |
| 6,176,042 | B1 * | 1/2001 | Rossman | A01K 1/0017 |
| | | | | 160/210 |
| 6,233,874 | B1 * | 5/2001 | Johnson, Jr. | E05B 65/0007 |
| | | | | 49/465 |
| 2006/0175028 | A1 * | 8/2006 | Askinasi | E06B 9/02 |
| | | | | 160/225 |
| 2006/0185253 | A1 * | 8/2006 | Marsden | E06B 9/04 |
| | | | | 49/465 |
| 2014/0191518 | A1 * | 7/2014 | Hellander | E05C 7/00 |
| | | | | 292/281 |

* cited by examiner

BI-DIRECTIONAL AUTOMATIC GATE LATCH ASSEMBLY

RELATED APPLICATIONS

This application claims the benefit of U.S. Provisional Patent Application No. 62/470,702 filed on Mar. 13, 2017. The entire content of this related application is incorporated herein by reference.

BACKGROUND OF THE INVENTION

Field of the Invention

The present invention relates generally to latch assemblies for gates, and in particular, to a latch assembly that secures a gate in a closed position, and that will allow the gate to be released in either direction from the closed position and automatically engages when the gate is returned to the closed position.

Description of the Related Art

A gate is a wall portion that can be rotated, typically with a hinge about a vertical axis, to allow or restrict access from one area to another area. When a gate is closed to restrict access between areas, it is secured in position with a latch. The latch secures the end of the gate opposite the hinge to a fixed portion of a wall. When opened to allow access between areas, it is sometimes desirable for the gate to be rotated into either area, opened left or opened right as looking along the gate from the hinge.

Many current latches require the operator to align mating members of the gate and the fixed wall to allow the latch to secure the gate.

Most latches have clearances designed between mating components to allow for the latch engagement. In a dynamic environment, such as a trailer, these clearances allow small relative motion of parts of the gate or latch that result in noise or rattle.

Some current latches are designed so that the engaging component must be forced to move to enact the engagement of the latch and securement of the gate. This condition results in a reaction time required for the latch component to respond and secure the gate. In situations of high gate velocity toward the closed position, the energy of the gate can cause the gate to rebound off a stop component before the latch secures it, thus failing to accomplish securing the gate. In other cases the gate may bypass engagement and travel from being open in one direction to being open in the other direction, again failing to accomplish securing the gate.

Some current latches are designed with ramp elements as part of the automatic engaging mechanism of the latch. These latches are significantly wider than the gate or the wall to which the latch is affixed.

There is a need for an improved gate assembly for use with livestock trailers and other pen assemblies in dynamic environments.

SUMMARY OF THE INVENTION

An object of the present invention is to provide an improved gate assembly suitable for use in a dynamic environment.

A further object of the present invention is to provide a gate assembly with a gate latch assembly that reduces the potential for relative motion between interconnected clearance parts and that minimizes noise or rattle produced by the gate and latch assemblies.

A further object of the present invention is to provide a gate latch assembly that automatically engages and secures the gate regardless of the gate velocity from an open position to a closed position.

A further object of the present invention is to provide a gate latch assembly that automatically engages when the gate is returned to the closed position.

A further object of the present invention is to provide a gate latch assembly that secures a gate against movement in either direction when closed, but allows the gate to be moved in either direction, left or right, when opened.

A further object of the present invention is to provide a gate latch assembly that requires specific action or actions from an operator to release the gate from the closed to the open positions, such as a multiple step action to unlatch the gate.

A further object of the present invention is to provide a gate latch assembly that is not significantly wider than the gate panel to which the gate latch assembly is affixed.

To accomplish these and other objects of the invention, a gate assembly is provided that has a gate panel with a gate hinge at one end and a latch assembly at the other end opposite from the gate hinge. A cylindrical base member is connected to a fixed portion of a wall, such as the sidewall of a livestock trailer. The gate latch assembly has a pivoting catch member for engaging the cylindrical base member when the gate panel is in a closed position. A latch channel member is provided for locking the pivoting catch member against rotation. The pivoting catch member is rotatable about a vertical axis and has an open channel on a side facing the cylindrical base member. The latch channel member has an open channel that faces generally downwardly toward the pivoting catch member. The latch channel member has a locked position in which the latch channel member is lowered into engagement with the pivoting catch member to lock the pivoting catch member against rotation. The latch channel member has released positions in which the latch channel member is raised from the locked position and positioned with one lower edge resting on an upper end of the pivoting catch member and the other lower edge below the upper end of the catch member to engage and prevent the pivoting catch member from pivoting past the latched position when the gate panel is closed. The latch channel member automatically moves from the released positions into the locked position when the gate panel moves from its right or left open positions to its closed position.

According to one aspect of the present invention, a gate assembly that can be latched to a fixed base member is provided, comprising: a gate panel having a gate hinge at one end and a gate latch assembly at another end opposite from the gate hinge. The gate latch assembly includes a pivoting catch member and a latch channel member. The pivoting catch member is arranged to engage the fixed base member to selectively latch and release the gate panel relative to the fixed base member. The pivoting catch member is rotatable about a vertical axis and has a first open channel on a side facing the fixed base member. The pivoting catch member is rotatable between a latched position and first and second unlatched positions to allow the gate panel to move from a closed position to right and left open positions, respectively. The latch channel member has a second open channel that faces generally downwardly toward the pivoting catch member. The latch channel member has a locked position in which the latch channel member is lowered into engagement with the pivoting catch member to lock the pivoting catch member against rotation, a first released position in which the latch channel member is raised and rotated from the locked position so that a first lower edge of the latch channel member is above an upper end of the pivoting catch member and a second lower edge of the latch channel member is below the upper end of the pivoting catch member, and a second released position in which the latch channel member is raised and rotated from the first locked position so that the second lower edge is above the upper end of the pivoting catch member and the first lower edge is below the upper end of the pivoting catch member. The latch channel member is arranged to automatically move from the first and second released positions back to the locked position upon the gate panel moving from the right and left open positions to the closed position, respectively.

According to another aspect of the present invention, a livestock trailer having multiple pen areas divided by a gate assembly is provided, with the gate assembly comprising a gate latch assembly as described above.

According to another aspect of the present invention, a gate latch assembly is provided for use with a gate panel, and the gate latch assembly has a structure as described above.

Numerous other objects of the present invention will be apparent to those skilled in this art from the following description wherein there is shown and described an embodiment of the present invention, simply by way of illustration of one of the modes best suited to carry out the invention. As will be realized, the invention is capable of other different embodiments, and its several details are capable of modification in various obvious aspects without departing from the invention. Accordingly, the drawings and description should be regarded as illustrative in nature and not restrictive.

BRIEF DESCRIPTION OF THE DRAWINGS

The present invention will become more clearly appreciated as the disclosure of the invention is made with reference to the accompanying drawings. In the drawings:

FIGS. 12 to 15 are a series of plan views that depict the gate latch assembly moving from an open position to a closed position.

DETAILED DESCRIPTION OF THE INVENTION

A gate assembly 10 having a gate latch assembly 11 according to the present invention will now be explained in detail with reference to FIGS. 1 to 15 of the accompanying drawings.

The gate assembly 10 includes a gate panel 12 having a gate hinge 13 at one end and the gate latch assembly 11 at the other end opposite from the gate hinge 13. A fixed base member 14 is provided on a fixed wall 15A, such as a sidewall of a livestock trailer. The gate latch assembly 11 is arranged to receive and engage the fixed base member 14 to selectively latch and release the gate panel 12 relative to the fixed base member 14. The gate latch assembly 11 automatically moves from a released condition into a locked condition when the gate panel 12 is moved to a closed position. The mating arrangement between the gate latch assembly 11 and the fixed base member 14 holds the gate panel 12 in the closed position. The fixed base member 14 can be a cylindrical-shaped member with a vertical central axis 16, as illustrated in FIGS. 1 and 12 to 15.

Figure 1:
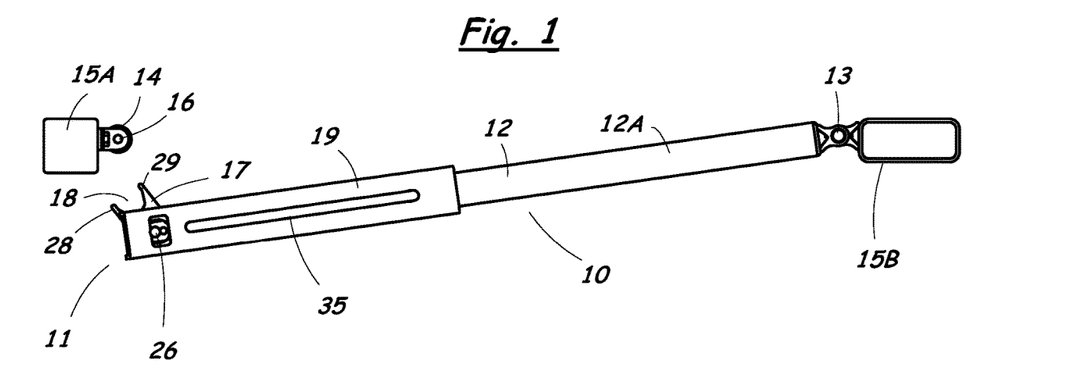
FIG. 1 is a plan view of a gate assembly according to the present invention.
Figure 2:
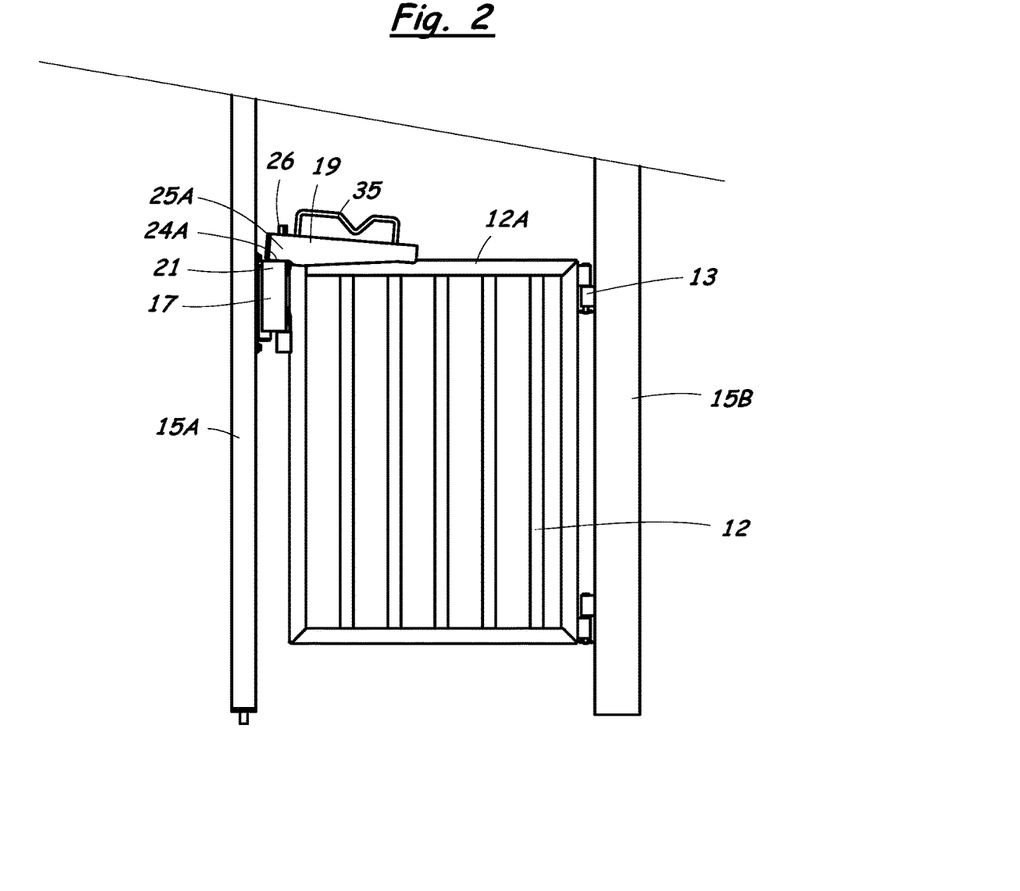
FIG. 2 is an elevation view of the gate assembly shown in FIG. 1.
Figure 3:
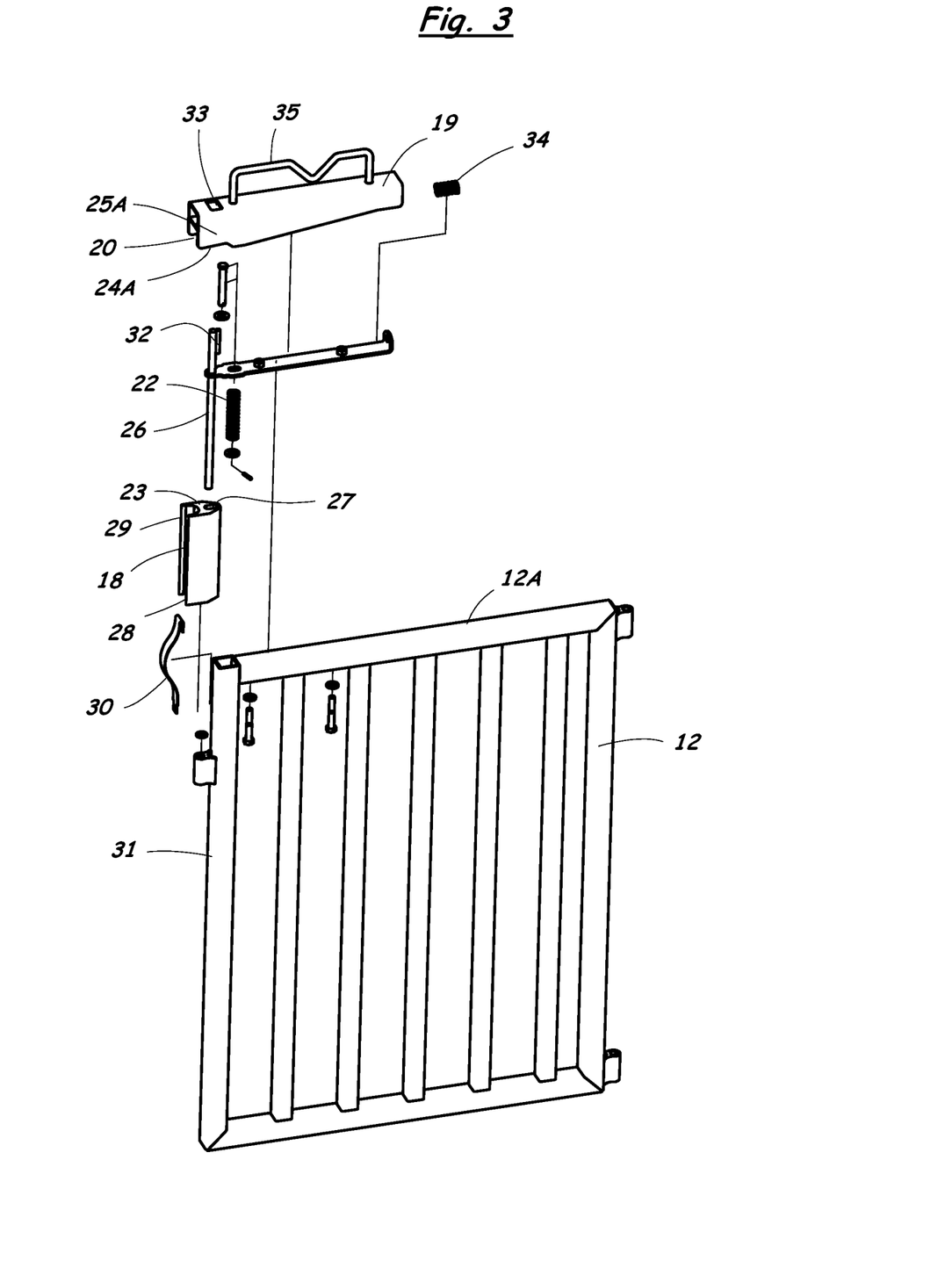
FIG. 3 is an exploded perspective view of a gate panel and gate latch assembly according to the present invention.
Figure 4:
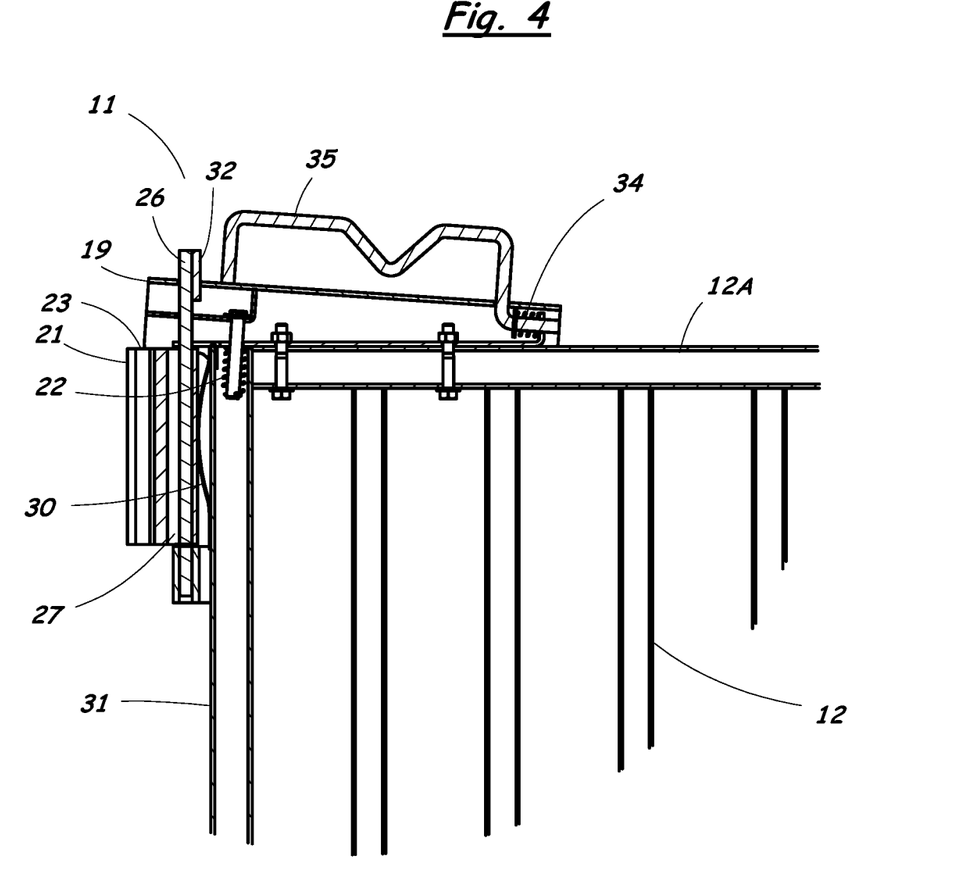
FIG. 4 is a detail cross section view of the gate latch assembly with a latch channel member shown in a released position.
Figure 5:
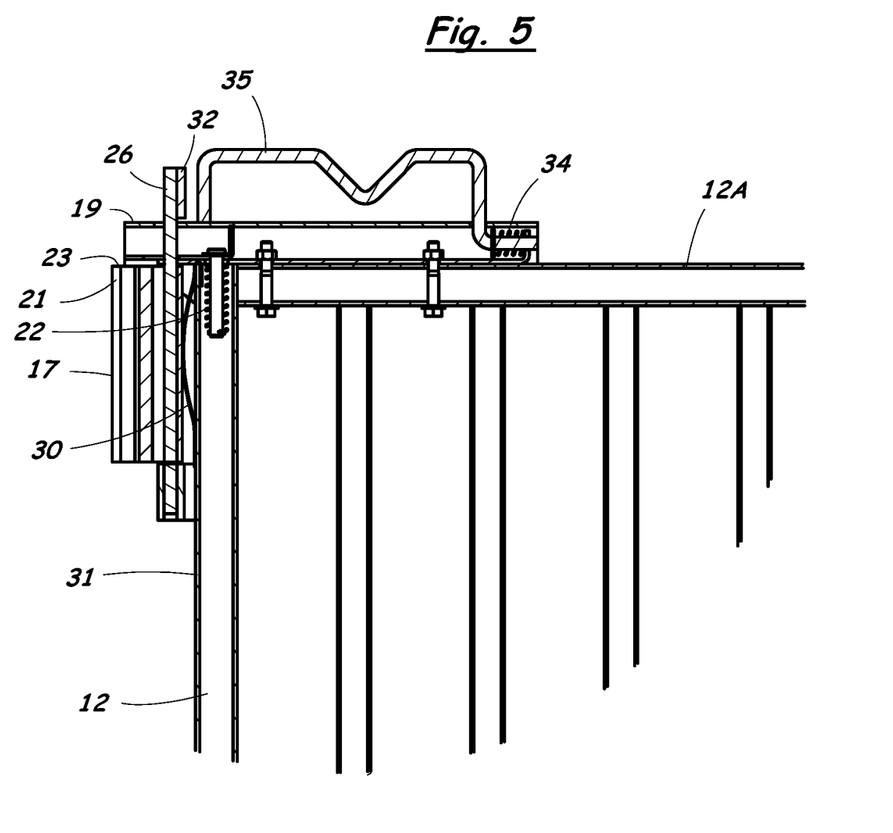
FIG. 5 is a detail cross section view of the gate latch assembly with the latch channel member shown in a locked position.
Figure 6:
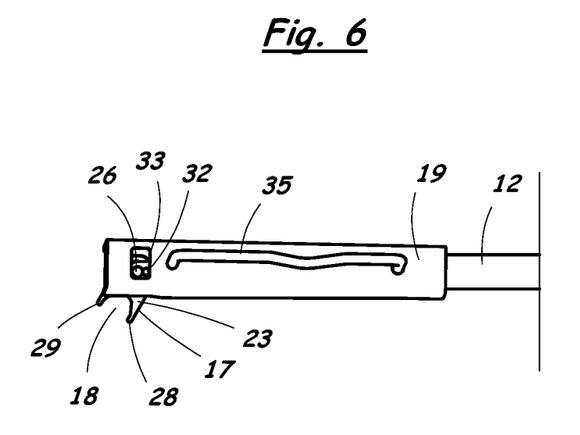
FIG. 6 is a plan view of the gate latch assembly with a pivoting catch member shown in an unlatched position.
Figure 7:
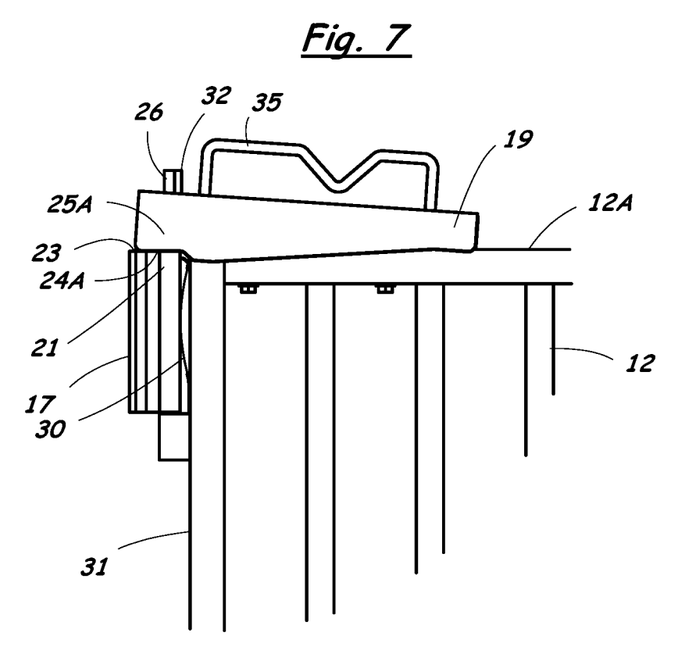
FIG. 7 is an elevation view of the gate latch assembly with the latch channel member shown in a released position and the pivoting catch member shown in an unlatched position.
Figure 8:
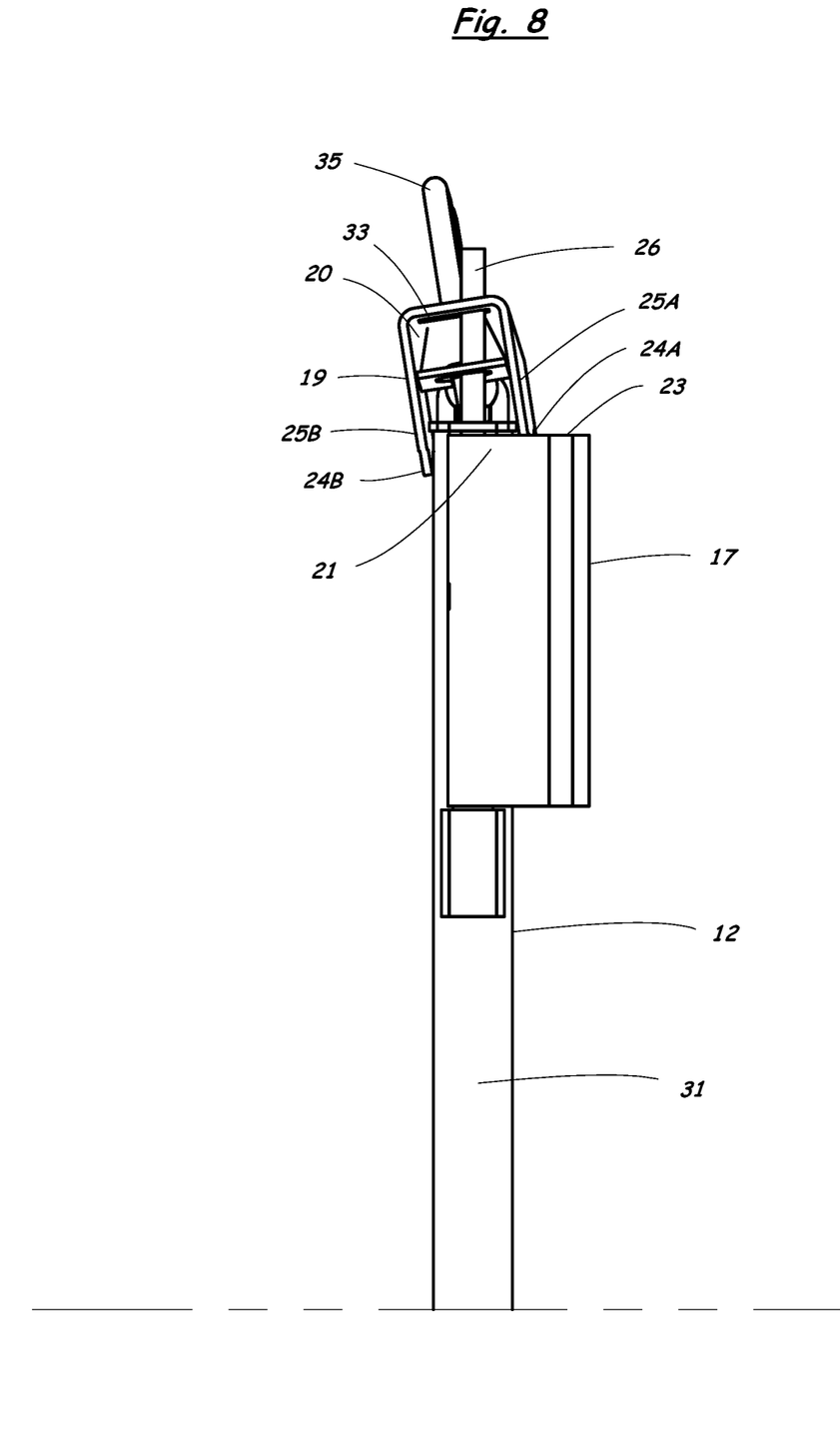
FIG. 8 is an end view of the gate latch assembly with the pivoting catch member shown in an open position, and the latch channel member shown in a released position with one longitudinal side edge resting on a top surface of the pivoting catch member and the other longitudinal side edge positioned lower than the top surface of the pivoting catch member.
Figure 9:
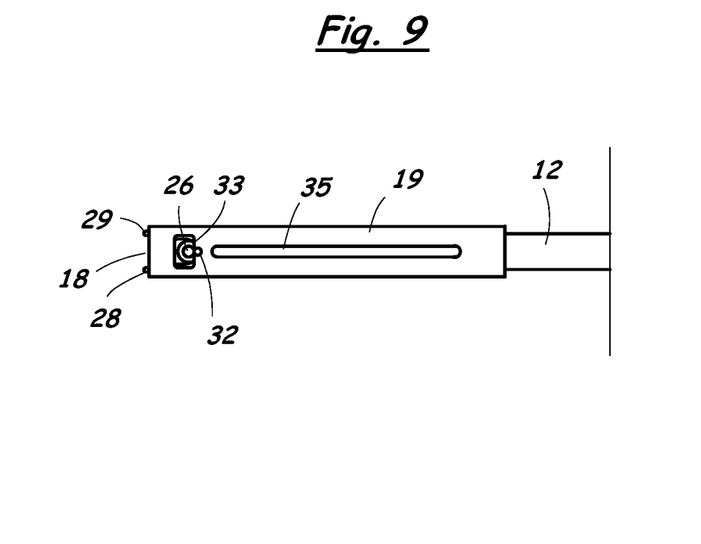
FIG. 9 is a plan view of the gate latch assembly with a pivoting catch member shown in a latched position.
Figure 12:
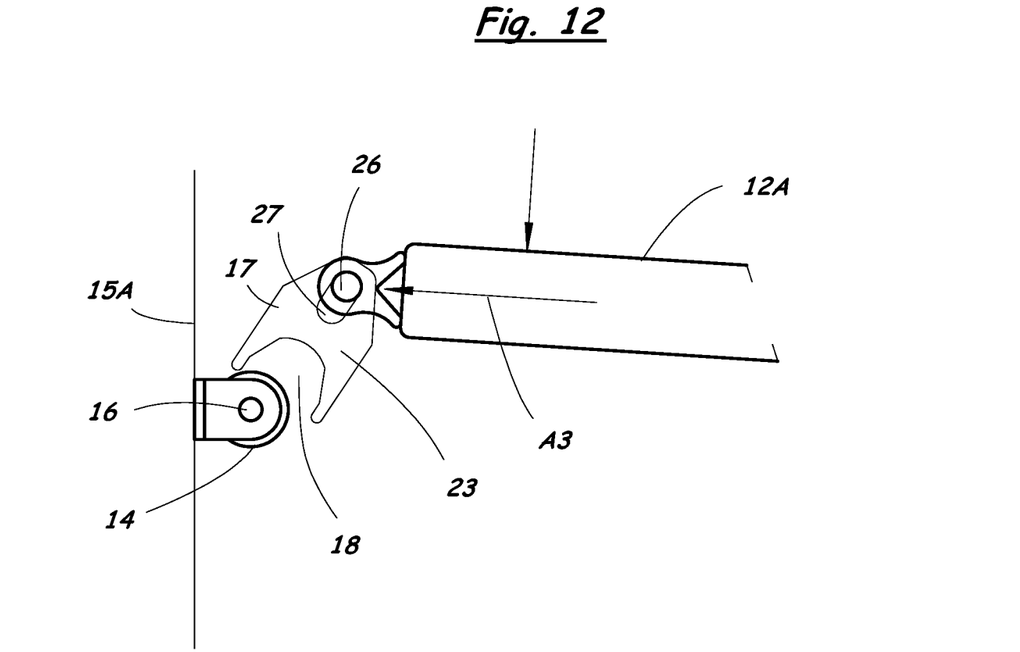
FIG. 12 shows the gate panel in an open position with the pivoting catch member in an unlatched open position.
Figure 13:
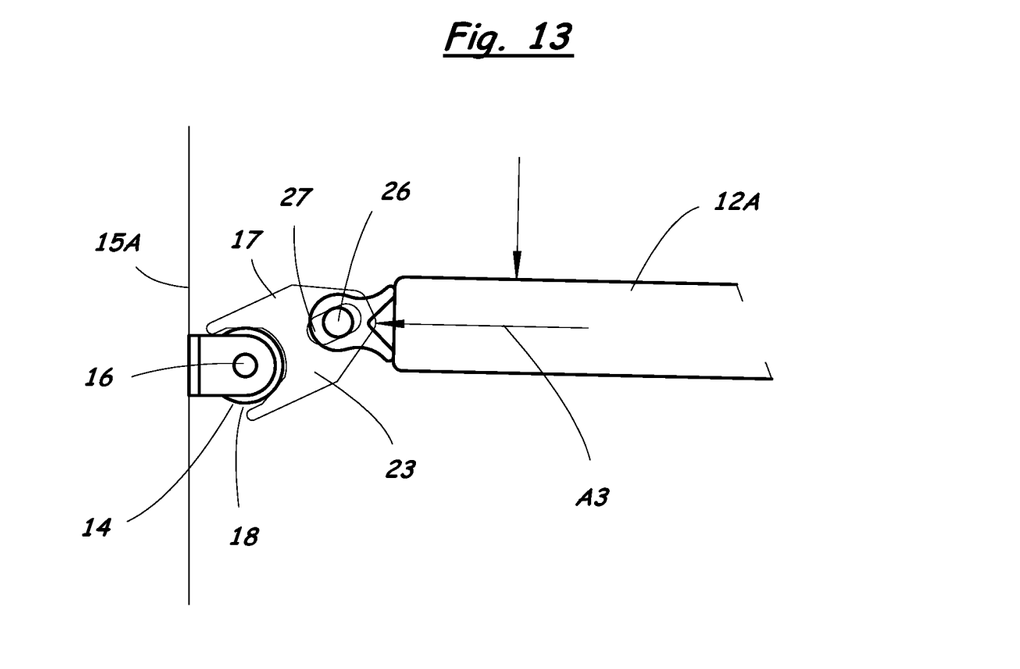
FIG. 13 shows the gate panel moving toward a closed position with the fixed base member received in the channel of the pivoting catch member.
Figure 14:
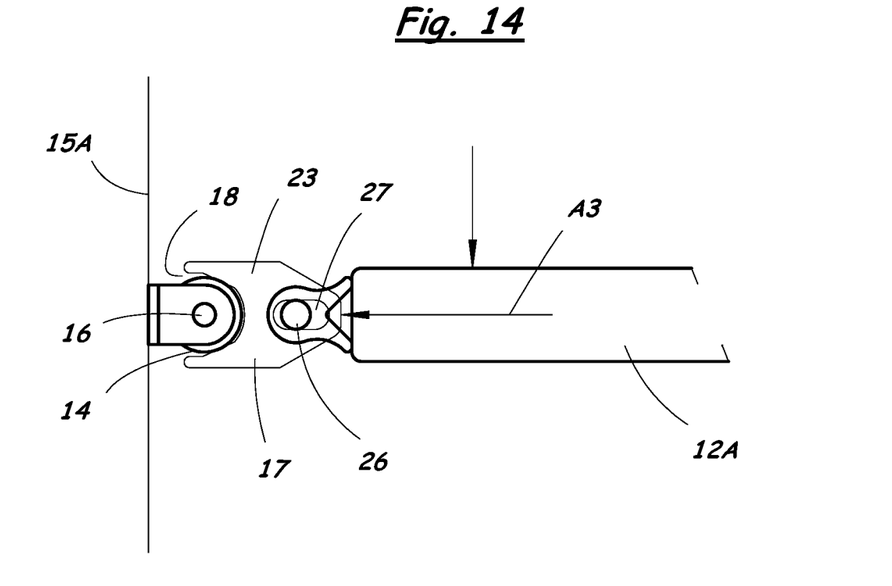
FIG. 14 shows the gate panel in a closed position with the fixed base member received in the channel of the pivoting catch member and the pivoting catch member pivoted to its latched position.
Figure 15:
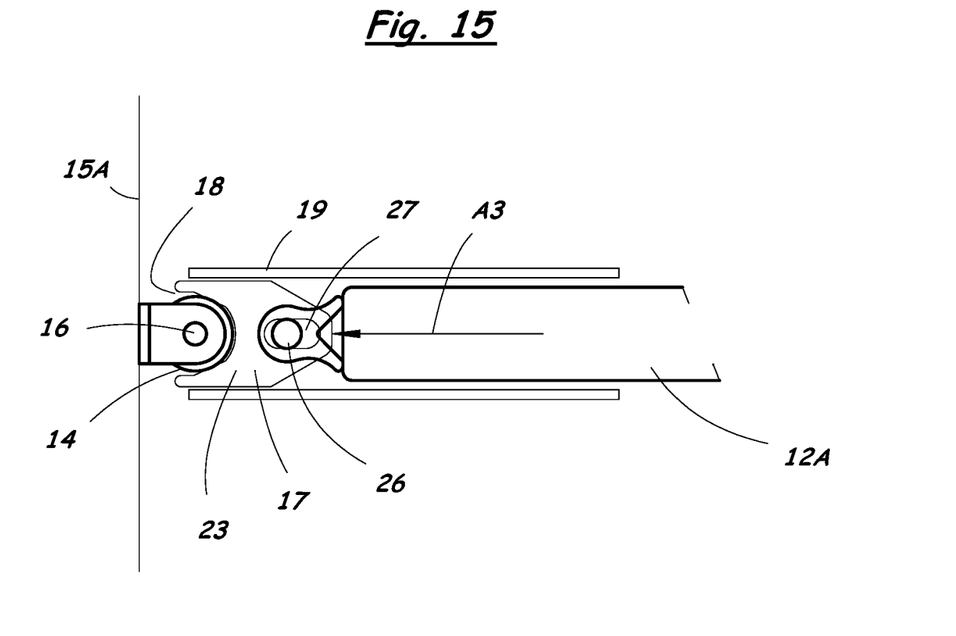
FIG. 15 shows the gate panel in the closed position with the latch channel member lowered into its locked position over an upper portion of the pivoting catch member.

The gate latch assembly 11 has a pivoting catch member 17 located on the end of the gate panel 12 opposite the gate hinge 13. The pivoting catch member 17 rotates about a vertical axis and has an open channel 18 on a side facing the fixed base member 14 to engage and mate with the fixed base member 14, as illustrated in FIGS. 12 to 15. The pivoting catch member 17 can rotate either direction, clockwise or counter-clockwise, to release the gate panel 12 to open right or open left. The pivoting catch member 17 is rotatable between a latched position (as illustrated in FIGS. 14 and 15) and first and second unlatched positions (as illustrated in FIGS. 1 and 12) to allow the gate panel 12 to move from its closed position to right and left open positions, respectively. In the illustrated embodiment, the open channel 18 of the pivoting catch member is semi-cylindrical-shaped with an open side that faces and receives the cylindrical-shaped base member 14.

The gate latch assembly 11 also has a latch channel member 19 with an open channel 20 that faces generally downwardly toward the pivoting catch member 17. The latch channel member 19 has a locked position (as illustrated in FIGS. 5, 10, 11 and 15) in which the latch channel member 19 is lowered into engagement with the pivoting catch member 17 to lock the pivoting catch member 17 against rotation. In the locked position, the latch channel member 19 captures the upper end 21 of the pivoting catch member 17 to restrict the rotation of the pivoting catch member 17, holding it in the latched position. The latch channel member 19 is biased in a downward direction toward the pivoting catch member 17 by a first spring 22.

The latch channel member 19 is attached to the gate panel 12 in a manner that it can be lifted into a released position to disengage from the pivoting catch member 17, thus allowing the pivoting catch member 17 to rotate to open the gate panel 12. Once the gate panel 12 is open, the pivoting catch member 17 remains in its released position, which is rotated from its locked position.

As the latch channel member 19 attempts to return to the locked position, the upper surface 23 of the pivoting catch member 17 blocks one of the lower longitudinal edges 24A, 24B of the latch channel member 19 on the side that the pivoting catch member 17 has rotated toward. The lower edge 24A or 24B of the latch channel member 19 rests on the upper end 23 of the pivoting catch member 17 in this released position. The latch channel member 19 is supported in a manner that also allows it to rotate about its horizontal longitudinal axis a limited amount. The longitudinal side 25A or 25B of the latch channel member 19 that is not supported against the upper end 23 of the pivoting catch member 17 rotates downward so that a lower portion of this side 25A, 25B of the latch channel member 19 is lower than the top 23 of the pivoting catch member 17.

Figure 10:
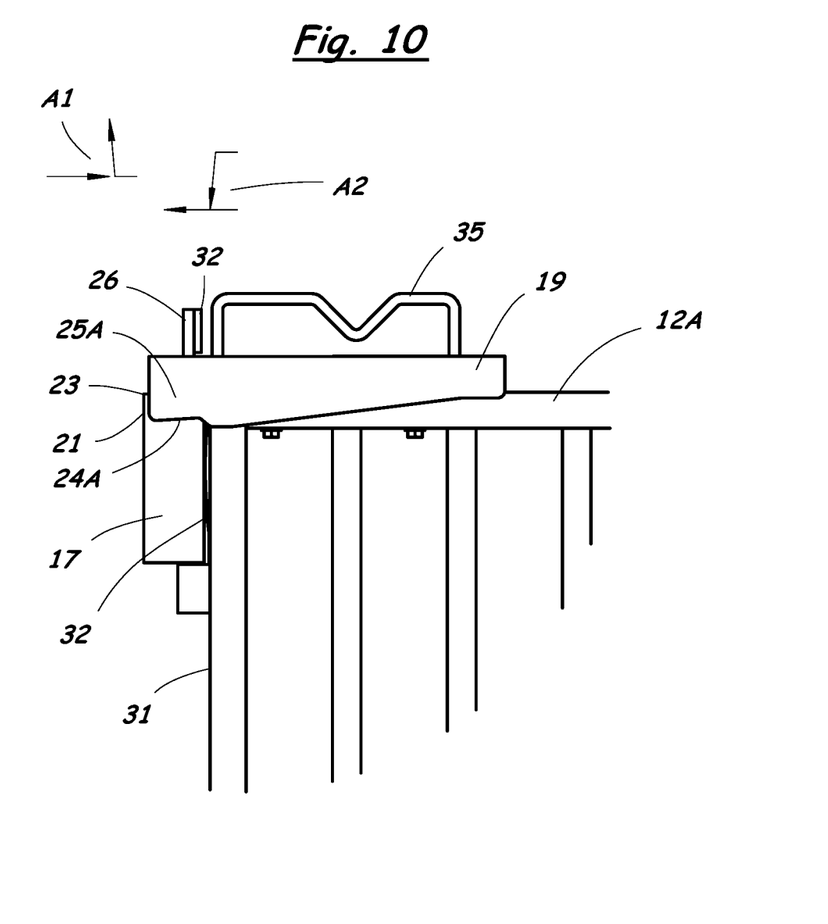
FIG. 10 is an elevation view of the gate latch assembly with the latch channel member shown in a locked position over an upper portion of the pivoting catch member.
Figure 11:
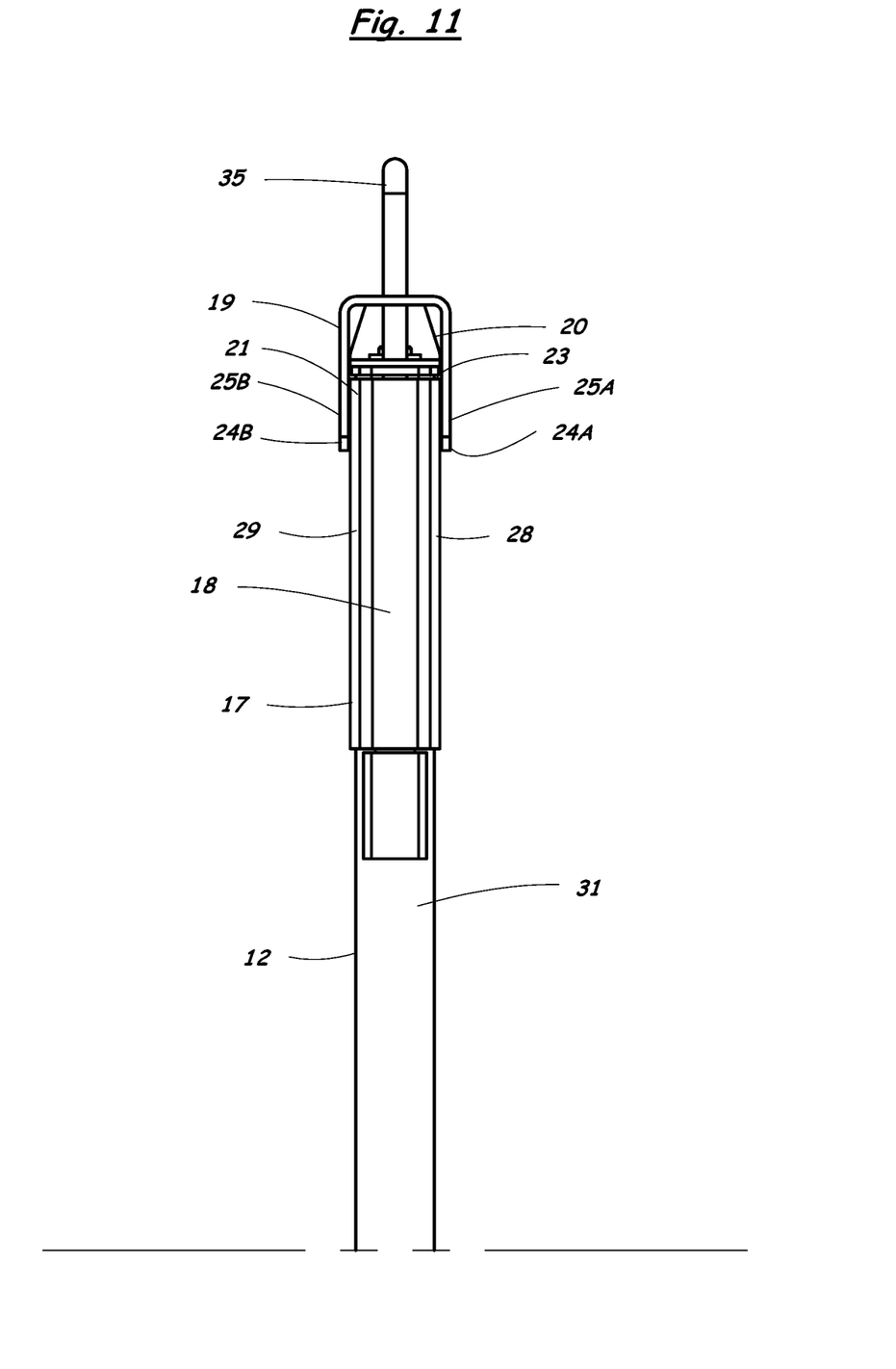
FIG. 11 is an end view of the gate latch assembly with the pivoting catch member shown in a closed position, and the latch channel member shown in a locked position over the upper portion of the pivoting catch member.

When the gate panel 12 is moved toward the closed position, the open channel 18 of the pivoting catch member 17 receives and engages the fixed base member 14, which causes the pivoting catch member 17 to rotate. As the pivoting catch member 17 rotates, the leading surface of the pivoting catch member 17 reaches and is blocked from further rotation by the lower portion of the side 25A, 25B of the latch channel member 19 that is below the top 23 of the pivoting catch member 17. This stops the motion of the gate panel 12 and prevents further rotation of the pivoting catch member 23. At this point, the pivoting catch member 17 is aligned in the latched position and the latch channel member 19 is forced downwardly by the first spring 22 to capture the upper end 21 of the pivoting catch member 17. Once the latch channel member 19 has moved completely down onto the pivoting catch member 17, the gate panel 12 is latched, as illustrated in FIGS. 10, 11 and 15.

As explained above, the gate panel 12 can be moved from a closed position (FIGS. 2, 5, 9, 10, 11 and 15) to right and left open positions (FIGS. 1 and 12) when the latch channel member 19 is in one of its released positions. In the first released position of the latch channel member 19, the latch channel member 19 is raised and rotated from its locked position so that the first lower edge 24A of the latch channel member 19 is above the upper end 23 of the pivoting catch member 17, and the second lower edge 24B of the latch channel member 19 is below the upper end 23 of the pivoting catch member 17. In the second released position of the latch channel member 19, the latch channel member 19 is raised and rotated from the locked position so that the second lower edge 24B is above the upper end 23 of the pivoting catch member 17 and the first lower edge 24A is below the upper end 23 of the pivoting catch member 17. By having one of the lower edges 24A, 24B of the latch channel member 19 below the upper end 23 of the pivoting catch member 17 to block movement of the pivoting catch member 17 past the latched position as the gate panel 12 is closed, the latch channel member 19 will automatically move from its released positions back to its locked position upon the gate panel 12 moving from either of its open positions to its closed position.

The gate latch assembly 11 is arranged so that no latch component has to be moved out of position by the motion of the gate panel 12 as it comes to the closed position. The orientation of the latch channel member 19 with an edge 24A, 24B below the upper end 23 of the pivoting catch member 17 primes the latch channel member 19 for engaging the pivoting catch member 17.

The pivoting catch member 17 is pivotally connected to the gate panel 12 by a round pin 26 that extends vertically through a slotted opening 27 in the pivoting catch member 17, as illustrated in FIGS. 3 and 12 to 15. The slotted opening 27 is oriented parallel to the longitudinal direction of the legs 28, 29 of the channel 18 of the pivoting catch member 17. This allows the distance between the pivoting catch member 17 and the gate panel 12 to vary by a slot length of the slotted opening 27 when the pivoting catch member 17 is in the latched position.

A second spring 30 is arranged between the end 31 of the gate panel 12 and the pivoting catch member 17 to force the pivoting catch member 17 away from the end 31 of the gate panel 12 to the extent allowed by the slotted opening 27. In the latched position the distance between the gate panel 12 and the cylindrical base 14 is designed to result in a gap between the gate panel 12 and the pivoting catch member 17 which is less than the maximum distance allowed by the slot length of the slotted opening 27. Once the latch channel member 17 is engaged in the closed position, the second spring 30 biases the pivoting catch member 17 toward the fixed base member 14 so that the pivoting catch member 17 is forced against the fixed base member 14. The direction of this force is depicted by arrow A3 in FIGS. 12 to 15 and results in a compressive force between the gate panel 12, the components of the gate latch assembly 11, and the fixed walls 15A, 15B on either side of the gate opening. In a dynamic environment, this condition reduces the potential for motion between interconnected clearance parts which minimizes the noise or rattle produced by the gate panel 12 and the gate latch assembly 11.

The attachment of the latch channel member 19 to the gate panel 12 allows the latch channel member 19 to slide longitudinally along a top member 12A of the gate panel 12. A keeper 32 is provided on an upper end of the vertical pin 26. When the latch channel member 19 is in the latched position it can be slid in a longitudinal direction into a restrained position in which an edge 33 of the latch channel member 19 is caught under the keeper 32. The keeper 32 restrains the latch channel member 19 from being lifted to unlatch the gate panel 12 when the latch channel member 19 is in the restrained position. A third spring 34 applies a force to the latch channel member 19 to bias the latch channel member 19 toward the restrained position.

This feature requires a two-step action to unlatch the gate panel 12. First, the latch channel member 19 must be slid parallel with the top member 12A of the gate panel 12 to an unrestrained position relative to the keeper 32, and then the latch channel member 19 can be lifted to release the gate latch assembly 11. This two-step action is difficult for most animals to accomplish but is easily accomplished by a human using only one hand. A handle 35 is provided on an upper side of the latch channel member 19 to facilitate lifting and rotating the latch channel member 19 to move the latch channel member 19 from its locked position to its released positions. The arrows A1 in FIG. 10 show the direction of movement needed to move the latch channel member 19 from the locked position to the released positions. The arrows A2 in FIG. 10 show the direction of movement needed to move the latch channel member 19 back into the locked position from the released positions.

The gate latch assembly 11 described above is particularly suitable for use in a livestock trailer to secure gate panels 12 that divide the trailer into multiple pen areas.

The gate latch assembly 11 described above provides several advantages and improvements over existing gate latches. For example, the gate latch assembly 11 secures the gate panel 12 against movement in either direction when closed, but allows movement in either direction, left or right, when opened. The gate latch assembly 11 requires specific action or actions from an operator to release the gate panel 12 from the closed to the open positions.

The gate latch assembly 11 automatically engages when the gate panel 12 is moved from the open position to the closed position. The gate panel 12 may approach the closed position from either the open left or open right positions. Once the gate panel 12 nears or reaches the closed position the gate latch assembly 11 will engage without interaction from the person operating the gate panel 12.

The gate latch assembly 11 produces a force against the latch and gate components to restrict undesired relative motion between components, yet does not interfere with the opening and closing operations of the gate panel 12 and the gate latch assembly 11.

The gate latch assembly 11 engages and secures the gate panel 12 automatically regardless of the gate panel 12 velocity from an open position to the closed position, within the typical velocity limits produced by human operation of the gate panel 12.

The gate latch assembly 11 is not significantly wider than the gate panel 12 because it does not require ramp elements as part of the automatic engaging mechanism.

While the invention has been specifically described in connection with specific embodiments thereof, it is to be understood that this is by way of illustration and not of limitation, and the scope of the appended claims should be construed as broadly as the prior art will permit.

What is claimed is:

1. A gate assembly that can be latched to a fixed base member, comprising:
    a gate panel having a gate hinge at one end and a gate latch assembly at another end opposite from said gate hinge;
    said gate latch assembly comprising a pivoting catch member and a latch channel member, said pivoting catch member being arranged to engage the fixed base member to selectively latch and release said gate panel relative to the fixed base member;
    said pivoting catch member being rotatable about a vertical axis and having a first open channel on a side facing the fixed base member, said pivoting catch member being rotatable between a latched position and first and second unlatched positions to allow said gate panel to move from a closed position to right and left open positions, respectively; and
    said latch channel member having a second open channel that faces generally downwardly toward said pivoting catch member, said latch channel member having a locked position in which the latch channel member is lowered into engagement with the pivoting catch member to lock the pivoting catch member against rotation, a first released position in which the latch channel member is raised and rotated from said locked position so that a first lower edge of the latch channel member is above an upper end of the pivoting catch member and a second lower edge of the latch channel member is below the upper end of said pivoting catch member, and a second released position in which said latch channel member is raised and rotated from said first locked position so that said second lower edge is above the upper end of the pivoting catch member and the first lower edge is below the upper end of the pivoting catch member, whereby said latch channel is arranged to automatically move from said first and second released positions back to said locked position upon said gate panel moving from said right and left open positions to said closed position, respectively.

2. The gate assembly according to claim 1, wherein said latch channel member is arranged to engage said pivoting catch member to prevent said pivoting catch member from pivoting past said latched position when said gate panel moves from said right and left open positions to said closed position.

3. The gate assembly according to claim 1, wherein said latch channel member has a handle on an upper side to facilitate lifting and rotating said latch channel member to move said latch channel member from said locked position to said first and second released positions.

4. The gate assembly according to claim 1, further comprising a first spring arranged to bias said latch channel member downwardly from said first and second released positions to said locked position.

5. The gate assembly according to claim 1, wherein said pivoting catch member has a slotted bore and is rotatable about a vertical pin that extends through said slotted bore, and said slotted bore is arranged to allow said pivoting catch member to move toward and away from an end of the gate panel.

6. The gate assembly according to claim 5, further comprising a second spring arranged to bias said pivoting catch member away from an end of the gate panel, whereby said pivoting catch member is biased toward the fixed base member when said gate panel is in said closed position, whereby a force of the second spring results in a compressive force between the gate panel, the gate latch assembly and the fixed base member to reduce motion between interconnected parts and minimize noise.

7. The gate assembly according to claim 1, wherein said pivoting catch member is rotatable about a vertical pin, an upper end of said pin has a keeper that restrains the latch channel member from being lifted to unlatch the gate panel, and said latch channel member is movable longitudinally between a restrained position with an edge caught under the keeper and an unrestrained position in which the edge is not caught under the keeper.

8. The gate assembly according to claim 7, further comprising a third spring arranged to bias said latch channel member in a longitudinal direction into said restrained position.

9. The gate assembly according to claim 7, wherein said pivoting catch member has a slotted bore that allows said pivoting catch member to be rotatable about said vertical pin and to be movable toward and away from an end of the gate panel.

10. The gate assembly according to claim 1, wherein said latch channel member is vertically movable and rotatable about a longitudinal axis to move between said locked position and said first and second released positions.

11. The gate assembly according to claim 1, wherein the fixed base member is cylindrical-shaped with a vertical central axis, and said first open channel of said pivoting catch member is semi-cylindrical-shaped with an open side that faces and receives the fixed base member.

12. In a livestock trailer having multiple pen areas divided by a gate assembly, the gate assembly comprising:
a gate panel having a gate hinge at one end and a gate latch assembly at another end opposite from said gate hinge;
said gate latch assembly comprising a pivoting catch member and a latch channel member, said pivoting catch member being arranged to engage a fixed base member on a sidewall of the livestock trailer to selectively latch and release said gate panel relative to the fixed base member;
said pivoting catch member being rotatable about a vertical axis and having a first open channel on a side facing the fixed base member, said pivoting catch member being rotatable between a latched position and first and second unlatched positions to allow said gate panel to move from a closed position to right and left open positions, respectively; and
said latch channel member having a second open channel that faces generally downwardly toward said pivoting catch member, said latch channel member having a locked position in which the latch channel member is lowered into engagement with the pivoting catch member to lock the pivoting catch member against rotation in the latched position of the pivoting catch member, a first released position in which the latch channel member is raised and rotated from said locked position so that a first lower edge of the latch channel member is above an upper end of the pivoting catch member and a second lower edge of the latch channel member is below the upper end of said pivoting catch member, and a second released position in which said latch channel member is raised and rotated from said locked position so that said second lower edge is above the upper end of the pivoting catch member and the first lower edge is below the upper end of the pivoting catch member, whereby said latch channel is arranged to automatically move from said first and second released positions back to said locked position upon said gate panel moving from said right and left open positions to said closed position, respectively.

13. The livestock trailer according to claim 12, wherein said latch channel member is arranged to engage said pivoting catch member to prevent said pivoting catch member from pivoting past said latched position when said gate panel moves from said right and left open positions to said closed position, and further comprising a first spring arranged to bias said latch channel member downwardly from said first and second released positions to said locked position.

14. The livestock trailer according to claim 12, wherein said pivoting catch member is rotatable about a vertical pin and has a slotted bore that allows said pivoting catch member to be movable toward and away from an end of the gate panel, and further comprising a second spring arranged to bias said pivoting catch member away from an end of the gate panel, whereby said pivoting catch member is biased toward the fixed base member when said gate panel is in said closed position, and a force of the second spring results in a compressive force between the gate panel, the gate latch assembly and the fixed base member to reduce motion between interconnected parts and minimize noise.

15. The livestock trailer according to claim 12, wherein said pivoting catch member is rotatable about a vertical pin, an upper end of said pin has a keeper that restrains the latch channel member from being lifted to unlatch the gate panel, said latch channel member is movable longitudinally between a restrained position with an edge caught under the keeper and an unrestrained position in which the edge is not caught under the keeper, and further comprising a third spring arranged to bias said latch channel member in a longitudinal direction into said restrained position.

16. A gate latch assembly for latching a gate panel to a fixed base member, comprising:
a pivoting catch member for engaging the fixed base member to selectively latch and release said gate panel relative to the fixed base member, said pivoting catch member being rotatable about a vertical axis and having a first open channel for receiving the fixed base member, said pivoting catch member being rotatable between a latched position and first and second unlatched positions for allowing the gate panel to move from a closed position to right and left open positions, respectively; and
a latch channel member having a second open channel that faces generally downwardly toward said pivoting catch member, said latch channel member having a locked position in which the latch channel member is lowered into engagement with the pivoting catch member to lock the pivoting catch member against rotation, a first released position in which the latch channel member is raised and rotated from said locked position so that a first lower edge of the latch channel member is above an upper end of the pivoting catch member and a second lower edge of the latch channel member is below the upper end of said pivoting catch member, and a second released position in which said latch channel member is raised and rotated from said locked position so that said second lower edge is above the upper end of the pivoting catch member and the first lower edge is below the upper end of the pivoting catch member, whereby said latch channel is arranged to automatically move from said first and second released positions back to said locked position upon movement of the gate panel to the closed position.

17. The gate latch assembly according to claim 16, wherein said latch channel member is arranged to engage said pivoting catch member to prevent said pivoting catch member from pivoting past said latched position when the gate panel moves from an open position to the closed position, and further comprising a first spring arranged to bias said latch channel member downwardly from said first and second released positions to said locked position.

18. The gate latch assembly according to claim 16, wherein said pivoting catch member is rotatable about a vertical pin and has a slotted bore for allowing said pivoting catch member to be movable toward and away from an end of the gate panel, and further comprising a second spring arranged to bias said pivoting catch member away from an end of the gate panel, whereby said pivoting catch member is biased toward the fixed base member when said gate panel is in said closed position, and a force of the second spring results in a compressive force between the gate panel, the gate latch assembly and the fixed base member to reduce motion between interconnected parts and minimize noise.

19. The gate latch assembly according to claim 16, wherein said pivoting catch member is rotatable about a vertical pin, an upper end of said pin has a keeper that restrains the latch channel member from being lifted to unlatch the gate panel, said latch channel member is movable longitudinally between a restrained position with an edge caught under the keeper and an unrestrained position in which the edge is not caught under the keeper, and further comprising a third spring arranged to bias said latch channel member in a longitudinal direction into said restrained position.

* * * * *